United States Patent [19]
Reid, Sr. et al.

[11] 3,710,671
[45] Jan. 16, 1973

[54] NOTE AND PITCH TEACHING MACHINE
[75] Inventors: John E. Reid, Sr., Mundelein; Russell N. Muehleman, Mount Prospect, both of Ill.
[73] Assignee: John E. Reid, Sr., Mundelein, Ill.
[22] Filed: Dec. 17, 1971
[21] Appl. No.: 209,198

[52] U.S. Cl. ................. 84/477 R, 84/478, 84/483
[51] Int. Cl. ............................................. G09b 15/02
[58] Field of Search....84/477 R, 478, 483, 484, 485, 84/454, 470, 471, 472

[56] References Cited

UNITED STATES PATENTS

| | | | |
|---|---|---|---|
| 2,619,868 | 12/1952 | Moore et al. | 84/484 |
| 2,727,424 | 12/1955 | Isaacson | 84/477 R |
| 2,806,953 | 9/1957 | Krauss | 84/454 X |
| 3,403,589 | 10/1968 | Fried | 84/478 |
| 3,541,916 | 11/1970 | Reid | 84/484 |

Primary Examiner—Richard B. Wilkinson
Assistant Examiner—John F. Gonzales
Attorney—Carlton Hill et al.

[57] ABSTRACT

A programmable machine for aiding in the development of note and pitch recognition employs encoded exercise cards carrying corresponding note indicia thereon and means for reading the cards to establish corresponding tuned circuits capable of passing only the frequency of a selected note for operating a mechanism to advance the card reading means. A circuit for indicating the exercise completion and a timer for permitting operation of the exercise completion circuit in response to favorable performance by the student within a prescribed time period are employed to produce a record of the student's achievement. This apparatus may be extended by dual coding of the cards to selectively establish oscillator circuit configurations in apparatus for tuning instruments and advantageously utilized in combination therewith to provide the student with an indication of whether he is playing a note sharp or flat.

15 Claims, 9 Drawing Figures

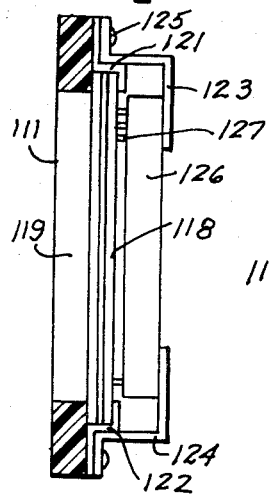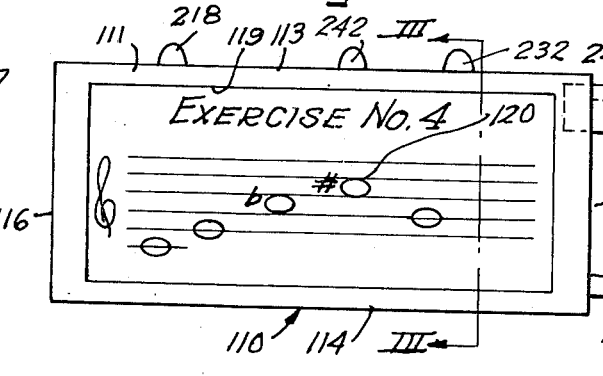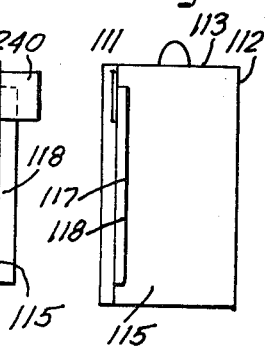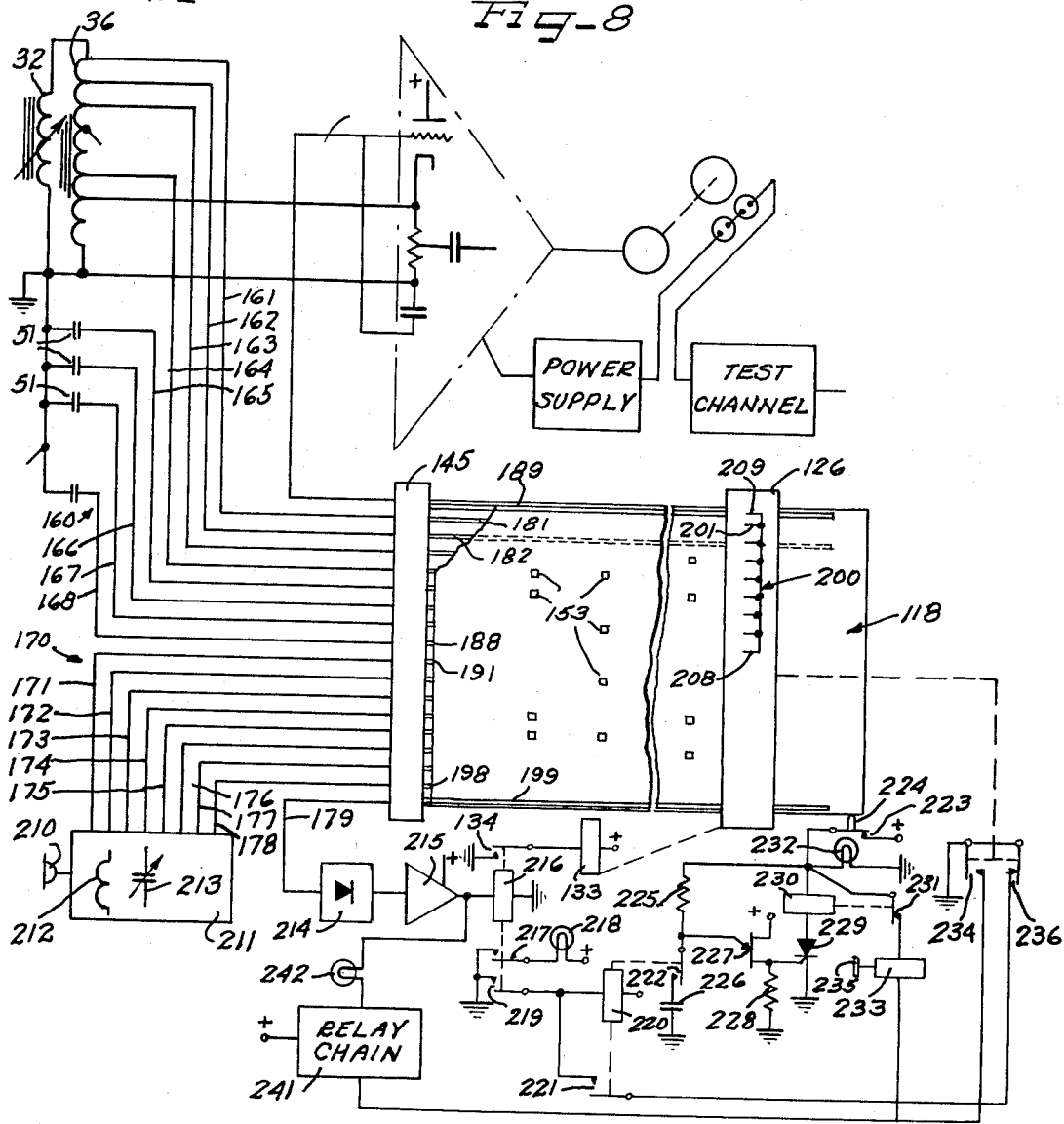

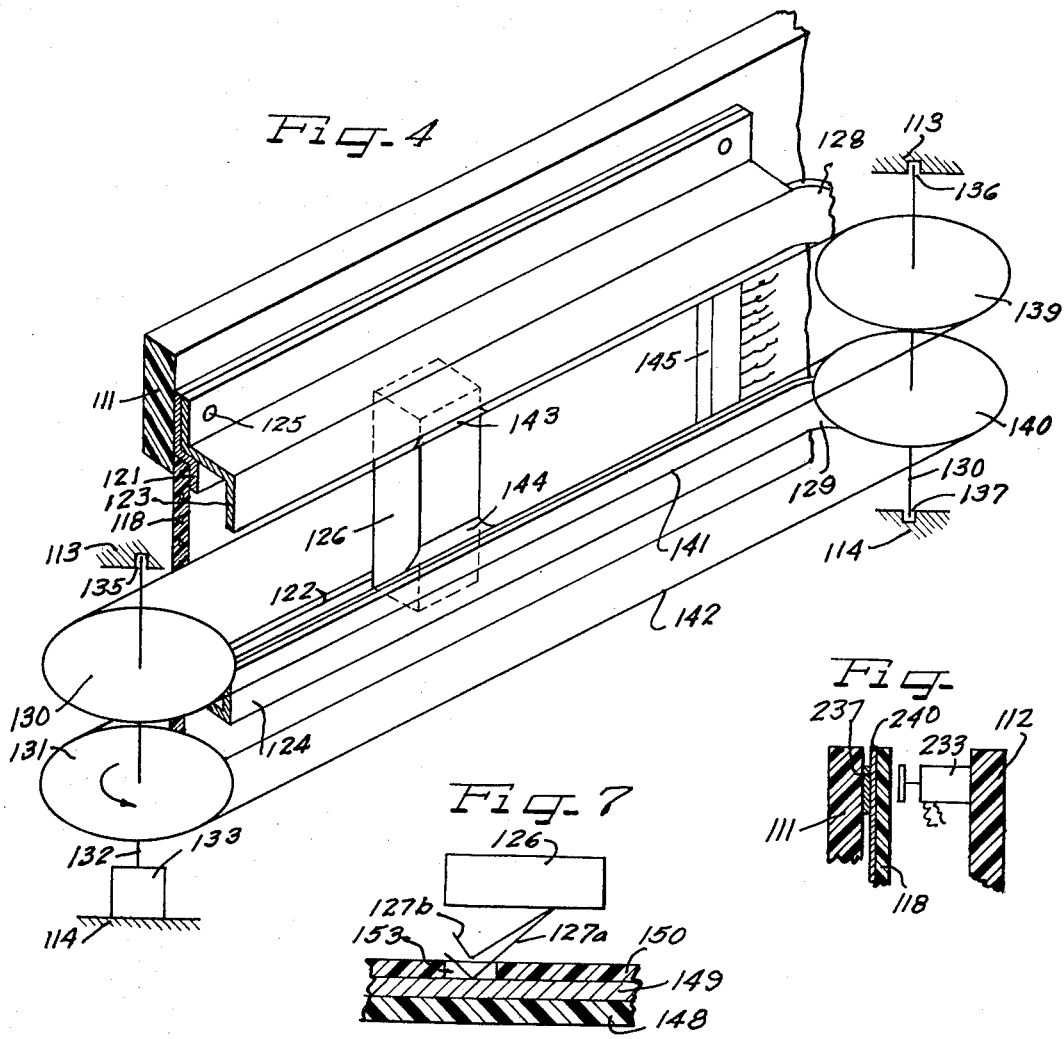

NOTE AND PITCH TEACHING MACHINE

BACKGROUND OF THE INVENTION

1. Field of the Invention

This invention relates to a note and pitch teaching machine and is more particularly concerned with a programmable note and pitch teaching machine which is operable to establish note and pitch criteria and be advanced through a musical exercise carried on a program card in response to accurate performance by a student.

2. Description of the Prior Art

Generally, apparatus for monitoring the performance of a music student is quite complex and does not permit the student to learn at his own individual rate. Also, such apparatus is quite expensive and has therefore found quite limited use, particularly in the teaching areas which can most advantageously utilize machine teaching methods, that is, in the music departments of elementary school systems.

In the area of instrument tuning machines, however, one type of machine has proven not only satisfactory but quite advantageous in practical applications. This machine employs apparatus disclosed by Serge L. Krauss in his U.S. Pat. No. 2,806,953, issued Sept. 17, 1957 and assigned to C. G. Conn, Ltd. Briefly, Krauss teaches the use of a selectably settable oscillator for deriving signals for driving a stroboscope disk by way of a synchronous motor and a tone receiving circuit for operating lamps behind the stroboscopic disk whereby an apparent null in disk movement is caused by the stroboscopic effect when the received note corresponds electronically to the oscillator frequency. If the note being played is off pitch, the scroboscopic disk does not appear to remain stationary but appears to revolve in one direction or the other to provide an indication of the note being sharp or flat. This instrument therefore provides an easy means for tuning a musical instrument.

SUMMARY OF THE INVENTION

Proceeding from the above-described Krauss patent, which is fully incorporated herein by this reference, it is the primary object of our invention to provide a programmable note and pitch teaching machine which can be easily operated by a student and which is effective to aid in training the student in note and pitch recognition and to improve the student's performance in note and pitch recognition.

Another object of our invention is to provide a note and pitch teaching machine which is easily programmable through the use of program cards carrying indicia of musical notes thereon for observation by the student and carrying a coded indicia of the same notes for programming the machine.

Another object of the invention is related to the student's performance and has ability to complete a prescribed exercise within a given amount of time wherein the time for each program card is unique thereto and selected by the card upon insertion thereof into the machine. An attendant object in this respect is to provide the student with a validation or record of satisfactory performance by stamping an indication thereof in the student's notebook or other record carrier upon satisfactory completion of an exercise.

A still further object of the invention is to provide a note and pitch teaching machine which is adapted to be utilized in conjunction with a musical instrument tuning apparatus, such as disclosed in the above described Krauss patent, whereby the student is provided with an indication of whether the note he is playing is sharp or flat.

The foregoing and other objects of the invention are realized through the provision of a note and pitch teaching machine which receives a programmed exercise card carrying:

1. Indicia in the form of musical notes of a musical exercise to be performed,
2. An encoded form of the note indicia,
3. An embossment or the like corresponding to the identification of the exercise, and
4. A code corresponding to the difficulty of the particular exercise. A code reading means is advanced along the card in response to satisfactory performance of each note to read the code of the following note. The coding on the card and the card reading means are effective to select tuned circuits, preferably high Q circuits which will pass primarily the fundamental frequency of a note being played by a student. The notes of correct pitch are sensed through the aforementioned selected network and are effective for operating a mechanism for advancing the card reading means.

Indicators in the form of lamps provide the student with an indication of insertion of the card and correct performance for each note played.

The machine is adapted to receive the student's music book or other record carrier, which may be a pressure sensitive type copy paper, and a punch is energized as the card reading means steps past the last note position at the end of the exercise. A timing circuit is further provided for inhibiting operation of the punch if the student fails to complete the exercise within a prescribed amount of time corresponding to the difficulty of the exercise.

BRIEF DESCRIPTION OF THE DRAWINGS

Other objects, features and advantages of the invention, its organization, construction and operation will best be understood from the following detailed description of a preferred embodiment thereof taken in conjunction with the accompanying drawings, in which:

FIG. 1 is a front elevational view of a note and pitch teaching machine constructed in accordance with the principles of the present invention;

FIG. 2 is an end elevational view of the note and pitch teaching machine illustrated in FIG. 1;

FIG. 3 is a sectional view of the front portion of the apparatus illustrated in FIG. 1 taken generally along the line III—III;

FIG. 4 is an oblique structural and diagrammatic representation of the program card, the card reading means, and the means for advancing the card reading means along the card as may be utilized in practicing the present invention;

FIG. 5 is a front view of a program card showing the musical indicia and the exercise indicia;

FIG. 6 is a sectional view of the program card of FIG. 5 taken generally along the line VI—VI.

FIG. 7 is a fragmentary view illustrating the coding of a program card and the reading of the code by the code reading means;

FIG. 8 is a schematic circuit representation of the programming, sensing, advancing, timing and punch operating circuits of the present invention as embodied in the environment of apparatus disclosed in the above-mentioned Krauss patent and as such apparatus may be combined as a part of the present invention; and FIG. 9 is a fragmentary illustration of the punch apparatus of the present invention.

For a more complete understanding of the apparatus disclosed by Krauss, one may refer to the aforementioned Krauss patent; however, inasmuch as the teachings of Krauss may advantageously be employed in the present invention and adapted for use in combination with presently disclosed apparatus as a means of carrying out the present invention, such apparatus has been schematically illustrated in FIG. 8 for the sake of completeness and given the same reference numerals as in the Krauss patent where such numerals apply.

DESCRIPTION OF THE PREFERRED EMBODIMENT

Referring to FIGS. 1, 2 and 3, a note and teaching machine is generally referenced 110 and illustrated as it may appear in its own separate housing which comprises a front wall 111, a rear wall 112, a top wall 113, a bottom wall 114, and end walls 115 and 116. The end wall 115 includes a slot or notch 117 for receiving a program card 118. The front wall 111 includes a window 119 to provide visual observation of the program card 118 so that a student may view a complete musical exercise carried as an indicia 120.

The program card 118 is slidably received through the slot 117 and between a pair of guide rails 121, 122 which are affixed by means of screws 125 or the like to the front wall 111 along with a corresponding other set of guide rails 123, 124 which guide the code reading means 126 along the surface of the card 118.

The code reading means includes a plurality of flexible fingers 127 for reading the code from the cards, as will become apparent from the description below.

Referring to FIG. 4, a rear view of the apparatus just described is provided along with means for advancing the code reading means 126 along the card. In FIG. 4, it can be seen that the code reading means traverses a generally elongate oval path and is received by flared portions 128, 129 of the guide rails 123, 124, respectively. The path of travel of the code reading means 126 is defined by a pair of endless chains or belts 141, 142 which are individually entrained about sprockets or pulleys 130, 139, and 131, 140. The sprockets 130, 131 are mounted for mutual rotation on a common shaft 132 which is rotatably journalled as indicated at 135 in the top wall 113 and which is driven by a stepping motor or stepping switch 133 carried on the bottom wall 114. The sprockets 139, 140 are mounted for mutual rotation on a shaft 138 which is journalled as diagrammatically indicated at 136, 137 in the top wall 113 and the bottom wall 114. The code reading means 126 is connected to each of the chains 141, 142 by members 143 and 144. It will be appreciated that the driving mechanism for advancing the code reading means 126 may take other forms, such as a single belt of substantially the same width as indicated by the spacing of the chains 141, 142. Such a spacing or width is preferred in order to prevent the moment created by the mass of the code reading means 126 from excessively pivoting the means 126 as it moves out of the guide rails and along the other longitudinal stretch of the path. The stepping of the code reading means is schematically indicated at a pair of contacts 134 which are closed for each stepping operation.

Referring to FIGS. 5, 6 and 7, a program card 118 is shown in greater detail. The card 118 carries the indicia 120 thereon, as previously noted. The card 118 may further carry an indicia 146 which indicates the particular exercise number and an embossment 147 to be employed in recording satisfactory completion of the exercise. The card 118 includes a front or top layer 148 of an electrically insulating material, a plurality of metallic strips 149 are employed for making contact at coded positions through apertures 153 in a further electrically insulating layer 150. The card 118 has one end 152 at which the insulating layer 150 does not cover the metallic strips 149 so that the metallic strips may engage contacts of an electrical connector 145 (FIGS. 4 and 8). Near each edge along the length of a card, there is provided an additional conductive strip 151 which is employed as the common contact in frequency selection, as will be set forth in greater detail below.

FIG. 7 illustrates the contacting of a spring contact 127a at a code aperture 153 and the position of a similar contact 127b adjacent thereto at an uncoded location. As the code reading means traverses the card 118, the spring contacts 127 which are biased toward the metallic conductive strips 149 enter the apertures 153 to make contact with the strips 149. As will be evident from the discussion of FIG. 8, the contacting of the strips 149 by the spring contacts 127 effect frequency selection for the note and pitch teaching machine.

Referring to FIG. 8, the apparatus as disclosed by Krauss is illustrated at the top of the Figure in schematic form and as it would be adapted for use in practicing the present invention. This apparatus includes a tapped inductor 36 connected in parallel with a calibration inductor 37 and connectible in circuit with a plurality of capacitors 51 to form the tuned circuit portions of an oscillator having a triode 35, a capacitor 38 which is common to each resonant circuit and an output to a following stage by way of a capacitor 55. The oscillator of the channel 30 is employed to operate a synchronous motor 60 which has a stroboscopic disk 26 driven thereby. Krauss employs a synchronous motor which rotates at 1200 rpm in response to 60 Hz and the motor provides one revolution for each three cycles of current from the oscillator. It that case, it was desired to have one rotation for each two cycles of the fundamental frequency of the tone being tested so that the actual frequency generated was at a 3:2 relation to the frequency of the received tone. Of course, other relationships may exist when using motors and/or stroboscopic disks of different ratings and configurations.

The power supply 32 is employed to supply power to the channel 30 and to the test channel 31 which receives an input tone by way of an input 14. A pair of neon lamps 24, 25 are powered from the power supply and have a light variation which follows the fundamental and harmonics of the tone beam received at the input 14. When the input tone at the input 14 electronically matches the frequency generated by the oscillator, the stroboscopic effect causes the stroboscopic disk 26 to appear stationary. As the received tone goes off pitch, the disk 26 appears to revolve slowly in one direction or the other to indicate a sharp or flat condition.

With the foregoing operation in mind, the present invention, embodied in a separate unit, or in combination with the above-discussed apparatus taught by Krauss, may be realized as illustrated in FIg. 8 wherein the taps of the inductor 36 and the individual capacitors 51 are extended by way of a cable 160 and the respective individual conductors 161–168 thereof to an electrical connector 145. A conductor 169 of the cable 160 extends the selected connection back to the grid of the tube 35. In a similar manner, the individual conductors 171–178 extend from the electrical connector 145 to a resonant circuit network 211 having a plurality of inductors and capacitors schematically illustrated at 212 and 213. It should be noted that the selection of these tuned circuits, which are preferably high Q circuits, may incorporate the selection of an inductor, or a capacitor, or both, or that the individual elements referenced 212, 213 might well be bridged-T or active bridged-T circuits as are well known in the art. A return conductor of the cable 170, a conductor 179, connects the selected resonant circuit to means for advancing the code reading means 126. This advancing means may comprise a full wave or bridge rectifier 214 which rectifies the received wave and passes a rectified signal to an amplifier or trigger circuit 215 which drives a relay 216 in response to each occurrence of a selected note at the proper pitch. The rectifier 214 and the amplifier 215 may be constructed to provide an operational threshold which would aid in ensuring that the received note through the filter network 211 is substantially at the proper pitch.

The relay 216 includes a contact 134 which is closed in response to energization of the relay 216 to advance the stepping motor 133 as schematically illustrated in FIG. 8 and diagrammatically illustrated in FIG. 4. In response to the operation of the stepping motor 133, the code reading means is advanced one step across the card to read the code at the following position in the form of the apertures 153.

In FIG. 8, the card 118 has been illustrated in more detail as to the conductive strips carried thereby. More specifically, the card carries a plurality of metal strips 181–199, preferably laid on by printed circuit techniques. The metal strips 181–188 provide selection of the various combinations of inductive taps of the winding 36 and the capacitors 51 to be used in combination with the capacitor 38 of the apparatus in channel 30. The selection by the code reading means is schematically illustrated in FIG. 8 wherein a plurality of conductors 201–208 which are connected to the corresponding spring contacts 127 are connected by way of a further conductor 209 and its corresponding spring contact and the middle strip 189 to the return conductor 169 of the cable 160. A similar electrical circuit is provided for the contacts 127 associated with the network 211, however, these circuit connections have not been illustrated in FIG. 8 for reasons of simplicity and clarity. The circuits are, however, identical to that shown at 200 for the channel 30.

The relay 216 includes a second set of contacts 217 which are operated to energize a lamp 218 upon the receipt of a proper tone input at the microphone 210 and corresponding subsequent operation of the relay 216. The relay 216 includes a set of contacts 219 which close to provide ground potential to a relay 220 each time a satisfactory result is obtained to step the code reading means 126. The relay 220 includes a contact 222 which closes a path for a timer circuit to begin timing for completion of the musical exercise. The relay 220 includes a set of contacts 221 which latches the relay by way of a set of contacts 236 to prevent interruption of the timing circuit from the time of the first stepping operation at the beginning of an exercise until the last stepping operation at the end of the exercise in order to nullify the pulsing effect of the contacts 219. The contacts 222 establish an RC timing circuit by way of a set of contacts 223 which are closed upon insertion of the card 118 which moves the actuator 224, a resistor 225 and a capacitor 226. A unijunction transistor 227 has its emitter electrode connected to the junction between the resistor 225 and the capacitor 226 and the unijunction transistor 227 fires upon charging of the capacitor 226 to a predetermined potential, as is well known in the art. The unijunction transistor 227 has one base electrode thereof connected to a supply potential and the other base electrode thereof connected to ground by way of a resistor 228. Therefore, upon firing, a positive potential is supplied to the gate electrode of a controlled rectifier 229 which has a relay 230 in its anode circuit. The controlled rectifier becomes conductive to energize the relay 230 after the passage of a predetermined amount of time which is related to the difficulty of the exercise.

A lamp 232 is provided to indicate proper insertion of the card 118 to establish the powering circuit for the timer.

At the end of the exercise and stepping of the code reading means past the last coded area, the code reading means 126 moves to a position where it closes a set of contacts 234 and opens a set of contacts 236. Opening of the contacts 236 removes the holding ground from the relay 220 to reset the timer. Closing of the contacts 234 provides a ground potential to a punch 233 which is further connected to a powering potential by way of a set of contacts 231 and the contacts 223. It is therefore readily apparent that if the timer times out and the relay 230 opens the contacts 231 prior to the time that the exercise is completed, the punch 233 is inoperative. The punch 233, shown in greater detail in FIG. 9, includes a punching head or hammer 235 and is associated with an anvil 237 carried by the housing, here by the front wall 111. At the beginning of an exercise, the student places a corner of his exercise book or other record carrier 240 in front of the embossment 147 (FIG. 5) as illustrated in FIGS. 1 and 9. Upon completion of the exercise within the prescribed time, the punch 233 strikes the card 118 forcing the embossment 147 against the record carrier 240 to provide an indication of satisfactory completion of the exercise. As noted above, the record carrier 240 may advantageously include a pressure sensitive reproduction sheet which will reproduce the embossment 147.

The time for performing an exercise will, of course, vary in accordance with the difficulty of performance. Therefore, means may be provided for selecting the RC time constant in accordance with the difficulty of the exercise. One means of providing selected timing is illustrated in FIG. 5 as comprising a plurality of resistors 225, here connected in parallel, which are shunted by corresponding contacts 225' as the corresponding contact operators 225''' are received in coding notches 225''. The closing of the contacts 225' in this particular illustration place more of the resistors 225 in parallel and therefore decrease the RC time constant. A single code notch may be employed to select a single resistance or combinations of code notches may be utilized to select combinations of resistances for varying the RC time constant as is well known in the art. In addition, it is readily apparent that the card may employ other selection means, for example, protrusions of the cards and normally open contacts. This type of coding may be employed at positions other than the bottom edge of the card illustrated in FIG. 5. For example, the card may be configured to extend in such a manner as to be wider at the end opposite to that engaged by the electrical connector 145 and coding provided at the extended portions. In addition, the switch operator 224 may be actuated by such an extension when the card is fully seated.

Referring back for a moment to the point at which the code reading means 126 travelled past the last coded portion of the card and opened the contacts 236 and closed the contacts 234, means are provided for resetting the code reading means to a point immediately adjacent the first coded section of the card and requires apparatus for automatically advancing the code reading means about the elongate oval path a prescribed number of steps equal to the distance to be travelled. The closing of the contact 234 also extends a ground potential to a relay counting chain 241 which is operable in response to the ground potential to provide the prescribed number of pulses to the relay 216 for effecting stepping of the code reading means 126 about the path to the desired location. The relay chain 241 is well known in the telephone and telegraph art, and the same function may, of course, be realized by a solid state flip-flop counter.

The circuitry provided to advance the code reading means 126 may be eliminated by proper dimensioning of the path of travel of the code reading means 126 with respect to the coded length of the card 118 when one or more additional identical code reading means are connected to the strands 141, 142 and carried along the path at spaced positions such that when one code reading means is leaving the last coded position, another code reading means is advancing to the first coded position.

Inasmuch as a student may be unaware of the completion of the exercise by failing to see the flash of the lamp 218, an additional indicator in the form of a lamp 242 is provided between the relay chain 241 and the relay 216 to provide a constant flashing as the code reading means is stepped to its initial code position. If multiple code reading means are utilized, a contact may be provided to operate a lamp through a circuit which provides for delayed termination of illumination of the lamp for a predetermined interval. This circuitry has not, however, been illustrated in the drawings.

It will be appreciated that the note and pitch teaching machine may utilize only that part of the circuit generally illustrated in the lower portion of FIG. 8. It will also be appreciated, however, that the note and pitch teaching machine may advantageously utilize the entire combination of elements illustrated in FIG. 8 so that a student is provided with the additional information regarding the sharp or flat characteristic of each note he is playing so that he may adjust his embouchure accordingly.

Although we have described our invention by reference to a specific illustrative embodiment thereof, many changes and modifications thereof may become apparent to those skilled in the art without departing from the spirit and scope of our invention. For example, the metal strips and layer structure of the program cards may be eliminated, the cards coded by holes or protrusions and the spring contacts 127 changed to switches or switch actuators for switches carried in the code reading means. The cables 160, 170 would then be connected to the switches via a slip ring type moving connection to the code reading means. Also, inasmuch as the ability to sustain tones for extended intervals is an integral factor in the mastery of wind instruments, a timing circuit of the type disclosed herein may be advantageously interposed between the rectifiers and the stepping apparatus to permit stepping only after a note has been properly sustained for a predetermined period of time. Therefore, it is to be understood that we intend to include within the patent warranted hereon, all such changes and modifications as may reasonably and properly be included within the scope of our contribution to the art.

We claim:

1. Apparatus for use in teaching note and pitch, comprising: a program card having an exercise of musical notes thereon and coded means having spaced coded sections corresponding to the musical notes; code reading means movable with respect to said program card for reading the coded sections; and means for advancing said code reading means along said program card in response to receipt of a note signal played by a student, including an input for receiving a note signal, settable means set by said code reading means to pass a note signal of a pitch corresponding to that of the musical note read, and drive means for moving said code reading means in response to passage of a signal by said settable means.

2. The apparatus of claim 1, comprising indicating means operable in response to the operation of said drive means for indicating satisfactory performance of the student in playing a note.

3. The apparatus of claim 1, wherein said drive means includes means operable to step said coded reading means from one coded section to the next, said program card carries an embossment corresponding to the degree of difficulty in performing the exercise, said apparatus comprises means for reproducing the embossment on a record carrier in response to completion of the exercises in response to the position of said code reading means, and timing means operated after a predetermined time interval to prevent operation of said reproducing means when the student fails to complete the exercise in a predetermined amount of time corresponding to the degree of difficulty of the exercise.

4. The apparatus of claim 3, wherein said timing means comprises time setting means for setting the timing interval thereof and said program card includes coded means for operating said time setting means in accordance with the degree of difficulty of the exercise.

5. The apparatus of claim 1, comprising settable generator means set by said code reading means to generate a signal of a pitch corresponding to that defined by the settable means, means for receiving the note signal played and means responsive to the generated signal and the received note signal to indicate whether the received note signal is sharp or flat with respect to the defined pitch.

6. The apparatus of claim 1, wherein said settable means includes frequency network means which are selectively interconnected in response to the code read by said code reading means.

7. The apparatus of claim 6, wherein said program card includes an electrically insulated carrier, a plurality of spaced metallic strips on said carrier connectible to said network means, and an electrically insulated code sheet carried on said carrier over said metallic strips and having spaced coding holes therein in registration with said metallic strips, and said code reading means includes contacts for contacting said metallic strips through the coding holes as said code reading means moves along said program card.

8. The apparatus of claim 7, wherein said card carries at least one metallic strip on said code sheet for continuous contact by a corresponding contact of said code reading means.

9. The apparatus of claim 1, wherein said drive means includes movable means defining a path of travel connected to said code reading means and electromechanical means connected between said settable means and said path defining means for operating said path defining means in response to passage of a note signal by said settable means.

10. The apparatus of claim 1, comprising means for releasably holding said program card and means mounting said code reading means for movement along said program card.

11. The apparatus of claim 10, wherein said means for holding said program card comprises card guide means for receiving said program card, and said mounting means for said code reading means includes means defining an endless path of travel and second guide means substantially coextensive with said card guide means in a portion of the path of travel for positioning said code reading means in close proximity to said program card.

12. The apparatus of claim 11, comprising switch means operated by said code reading means as it advances beyond the last code section of said card, and means connected to said switch means and said drive means and operated by said switch means to advance said code reading means along said path to a point adjacent the first code section of said card.

13. The apparatus of claim 12, comprising means connected to said switch means for indicating completion of the exercise in response to operation of said switch means.

14. Apparatus for use in teaching note and pitch, comprising: program means indexable to establish a sequence of pitch occurrences to be received from a student's instrument including means providing the student with a visual indication of the sequence as a musical exercise; means for receiving the pitches played and operable in response thereto and to the programmed pitches to index said program means when the pitches agree; and means for indicating satisfactory performance of the exercise including timing means and means for comparing the performance time with respect to a predetermined time.

15. The apparatus of claim 14, comprising means programmable by said program means for receipt of the sequence of pitches to generate corresponding standard pitches and means for receiving the standard pitches and played pitches and operable to indicate the sharp or flat condition of the played pitches with respect to the respective standard pitches.

* * * * *